United States Patent [19]
Shurtleff

[11] Patent Number: 5,264,126
[45] Date of Patent: Nov. 23, 1993

[54] CLARIFIER DRIVE FOR WASTE WATER TREATMENT SYSTEM

[75] Inventor: Robert H. Shurtleff, Lago Vista, Tex.

[73] Assignee: Enviroquip, Inc., Austin, Tex.

[21] Appl. No.: 944,773

[22] Filed: Sep. 14, 1992

[51] Int. Cl.$^5$ ............................................. B01D 21/20
[52] U.S. Cl. .................. 210/528; 210/541; 74/606 R
[58] Field of Search ............ 210/523, 525, 528, 529, 210/541, 542; 74/606 R

[56] References Cited

U.S. PATENT DOCUMENTS

| | | | |
|---|---|---|---|
| 2,855,101 | 10/1958 | Scott | 210/528 |
| 2,866,352 | 12/1958 | Scott | 210/528 |
| 3,959,151 | 5/1976 | Liebowitz | 210/528 |
| 4,048,076 | 9/1977 | Pearre et al. | 210/528 |
| 5,018,407 | 5/1991 | Hoecht | 74/606 R |
| 5,194,155 | 3/1993 | Schwartz | 210/528 |

OTHER PUBLICATIONS

Avon Bearings Corporation Design Guide & Catalog, pp. 1-37, 1989.
Brochure, Eimco Process Equipment Company.
Brochure, "Integral gear, precision bearing drives," WesTech Engineering, Inc., 1990.
Brochure, "Thickener Drives," Walker Process Equipment, Inc.

*Primary Examiner*—Christopher Upton
*Attorney, Agent, or Firm*—Arnold, White & Durkee

[57] ABSTRACT

An improvement is provided in a water or wastewater clarifier drive mechanism to permit access to or removal of the hoop gear assembly without draining the clarifier or disconnecting the drive cage from the pier that supports it. A torque transfer ring is provided to couple the drive cage support to the hoop gear. A plurality of support screws are employed to temporarily support the drive cage support on the drive housing during maintenance operations. With the drive cage support supported on the drive housing, the torque transfer ring may be removed, thereby providing unobstructed access to the hoop gear and bearings for maintenance or replacement. A maintenance platform is also described that is adapted to be temporarily supported by the drive cage support and to provide clearance for removal of the torque transfer ring and the hoop gear or bearing assembly.

11 Claims, 3 Drawing Sheets

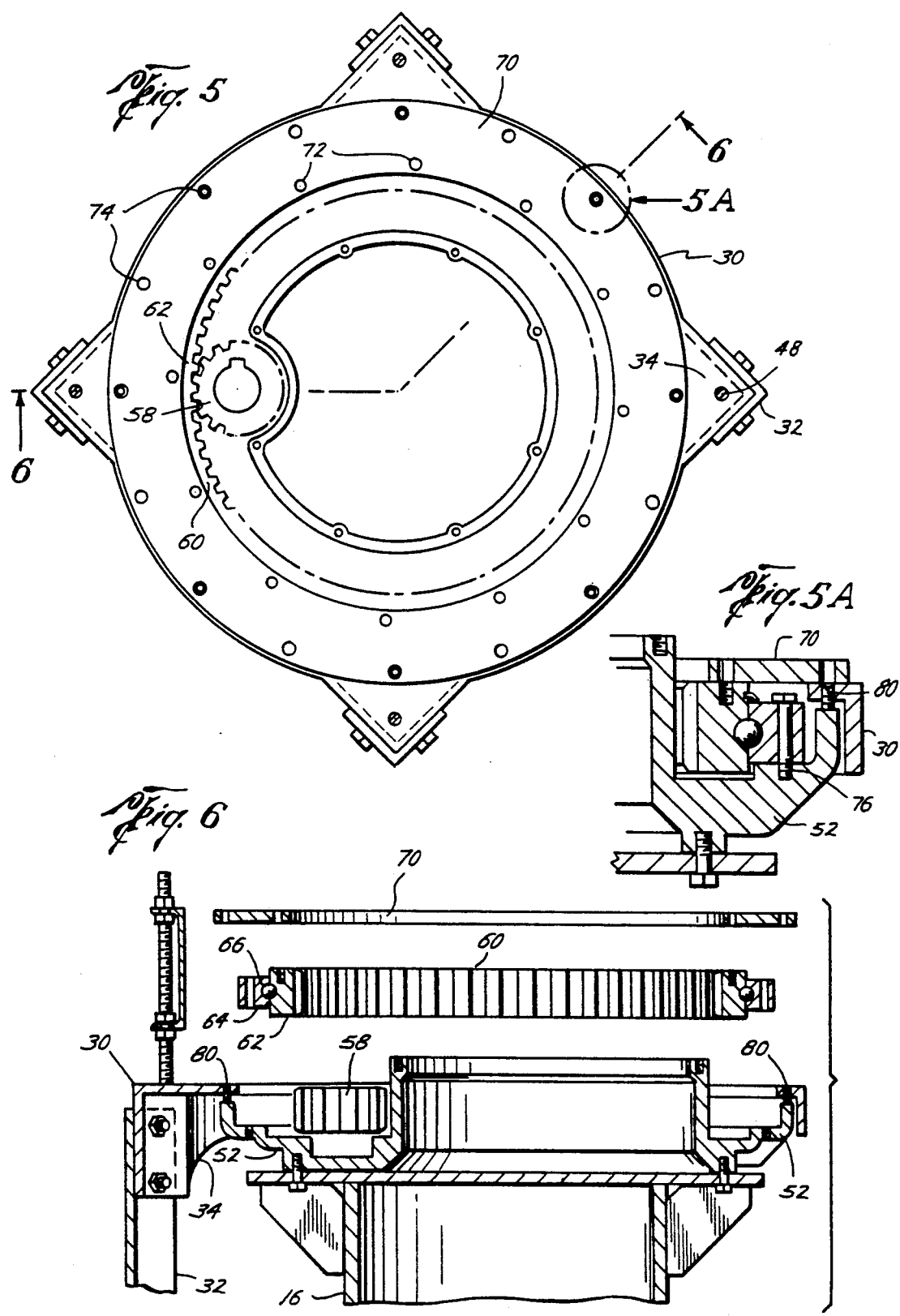

CLARIFIER DRIVE FOR WASTE WATER TREATMENT SYSTEM

BACKGROUND OF THE INVENTION

This invention relates to water and wastewater treatment. In particular, it relates to an improvement in a mechanism that drives flight arms in a clarifier.

Center driven circular collectors or clarifiers are almost universally used in the United States as a settling or clarifying step in the treatment of water and wastewater. They provide an opportunity for solids that are suspended in the fluid being treated to fall to the bottom of the clarifier where they can be removed as sludge. The clear liquid is then skimmed off of the top of the clarifier and directed to additional treatment processes.

To permit continuous operation of a clarifier, it is necessary to provide for efficient removal of sludge from the bottom of the clarifier. Typically, a set of angled metal squeegees are provided for this purpose. The squeegees are arranged to "plow" the sludge to a receptacle where it is removed from the clarifier by any of a number of methods known to those of skill in the art. The squeegees are coupled to clarifier arms or flight arms that extend across the radius of the clarifier and that are supported by and adapted to rotate about a vertical pier positioned at the center of the clarifier. By rotating the flight arms within the circular clarifier, the squeegees are able to efficiently sweep substantially the entire floor of the clarifier.

In a typical installation, the flight arms and their associated squeegees are driven by a mechanism located on the pier in the center of the clarifier. The flight arms are connected to the lower end of a drive cage that encircles the central pier. The top of the drive cage is coupled to a drive cage support located near the top of the pier. The drive cage support is coupled to a hoop or ring gear that is internally cut and supported by a suitable bearing assembly, and the gear is driven by a pinion that is in turn driven by any suitable power source, typically an electric motor coupled to the pinion via one or more gear reducer assemblies.

The squeegees, flight arms, drive cage and drive cage support together may be referred to as the driven assembly. Alternatively if the drive cage and drive cage support are formed as one piece, a driven assembly may just consist of squeegees, flight arms, and a drive cage. The drive cage support is generally a steel casting, however it may be made from welded steel. The driven assembly and its components may, thus, comprise numerous components rigidly connected. Independent of the terminology used, the driven assembly is typically coupled to a gear or other driven mechanism such that the clarifier floor is substantially swept.

The clarifier thus typically includes stationary parts, which do not rotate with respect to the pier, including a drive housing, an outer bearing race, a cover plate to cover and protect the gear and bearing assembly and to support the power source, and the power source itself. The clarifier also includes rotating parts, including the hoop gear with its integral inner bearing race, the rotating drive cage support and the driven assembly.

Finally, a clarifier is often equipped with an access bridge, which typically includes a walkway from the edge of the clarifier to the center where the pier is located, and perhaps a working platform constructed above the pier. The bridge provides convenient access for inspection and maintenance of the various clarifier drive components.

Of all of the components in a clarifier, the drive mechanism typically requires the most maintenance. The weight of the flight arms is borne by the bearings positioned between the inner and outer races, and the torque required to drive the flight arms is transmitted through the pinion and hoop gear to the other rotating components. It is therefore occasionally necessary to gain access to the hoop gear, ball bearings and bearing races for maintenance or replacement.

In other designs not incorporating the present invention, it is necessary to disconnect the drive cage from the rotating drive cage support in order to service the bearings. This procedure requires supporting or holding up the flight arms, squeegees and drive cage prior to disconnecting the drive cage in order to disassemble the drive gear and bearings. Supporting the flight arms, usually requires draining the clarifier. Thus a relatively simple job is turned into a laborious project involving disconnecting and supporting the drive cage, flight arms and squeegees while disassembling, repairing, and reassembling the drive mechanism, then reconnecting the drive cage and squeegees and removing the supports. There are several known prior art designs for drive mechanisms that provide different ways of gaining access to the bearings and gears, but each requires disconnection of the drive cage from the rotating drive cage support. Further, in designs not incorporating the present invention, the bridge generally must be removed, by hoisting with a crane for example, in order to remove the hoop gear.

SUMMARY OF THE INVENTION

The present invention eliminates the need to disconnect and support the drive cage and flight arms prior to disassembling the drive assembly. A novel torque transfer ring design is employed which allows the drive cage support, drive cage and flight arms to be temporarily supported by the stationary drive housing while the torque transfer ring, hoop gear, bearing races and bearings are removed for maintenance or replacement. The entire mechanism can be disassembled and reassembled quickly and easily from the bridge with the aid of, for example, a portable engine hoist, eliminating many hours or even days of down-time for disconnecting and supporting the drive cage, flight arms and squeegees, and likely drainage of the clarifier basin. Also, the expense of engaging a motor crane is avoided.

This invention is an improvement to a clarifier drive mechanism as described above. A torque transfer ring is adapted to be connected between the hoop gear and the rotating drive cage support. In a preferred embodiment, the torque transfer ring has a plurality of outer bolt holes to correspond with bolt holes in the drive cage support and a plurality of inner bolt holes to correspond with bolt holes in the hoop gear. Means are provided for supporting the drive cage support and the driven assembly, which includes the drive cage, flight arms, flights, and squeegees, such that the drive cage support may be disconnected from the torque transfer ring without requiring additional support for the drive cage support and the driven assembly and without disconnecting the drive cage from the drive cage support.

The drive cage support may be supported by a plurality of support screws adapted to pass through the outer bolt holes in the torque transfer ring and to engage threaded bolt holes in the drive cage support so as to protrude beneath the drive cage support to contact the stationary drive housing, and to thereby support the drive cage support and the driven assembly upon the drive housing.

The invention also includes means for supporting the bridge above the pier and adapted to provide clearance to permit removal of the torque ring, hoop gear, bearings and raceways. In a preferred embodiment, this means comprises a plurality of jack bolts which engage bridge members and which are adapted to rest on top of the drive cage support, which is in turn supported by the drive housing while the torque transfer ring is removed.

The bridge ordinarily covers and is supported by the cover plate of the drive housing. In this invention the bridge is designed to be partially disassemblable to provide access for removal of the cover plate and the underlying components. In a preferred embodiment, the bridge comprises removable platform support channels adapted to be secured to the cover plate of the drive means, which platform support channels may be removed when the bridge is supported by the above-mentioned jack bolts. Removal of the platform support channels permits removal of the cover plate for access to the pinion gear, torque ring, hoop gear, bearings, and bearing races and other components of the drive mechanism.

The present invention therefore provides an improved device which allows maintenance to be performed on a clarifier drive mechanism without draining the clarifier and without disconnecting the driven assembly from the pier or disassembling the driven assembly, in particular without requiring lifting, shoring up or supporting the driven assembly and without requiring unbolting the driven assembly from the drive cage support. The driven assembly continuously rests on the pier during drive mechanism maintenance. As would be recognized by those skilled in the art, the present invention may have applications in wastewater basin driven assemblies other than clarifiers, such as in thickeners. These and other advantages of the present invention will be further appreciated from the drawings and from the detailed description provided below.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiment thereof, which is illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

FIG. 5 is a plan view of the clarifier drive mechanism according to this invention, illustrating the torque transfer ring when the cover plate is removed.

FIG. 5A is a cross-sectional detail illustration showing the torque transfer ring, hoop gear, drive cage support and drive housing according to the present invention, illustrating the drive housing directly supporting the drive cage support.

FIG. 6 is an exploded cross-sectional view, along section line 6 of FIG. 5, illustrating the removal of the torque transfer ring and the hoop gear.

DETAILED DESCRIPTION OF A PREFERRED EMBODIMENT

Figure 1:
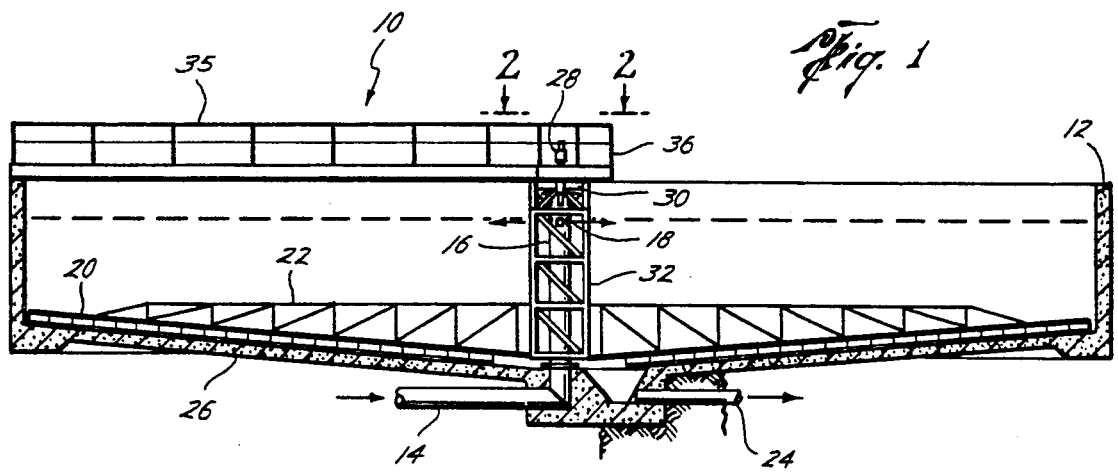
FIG. 1 is a cross-sectional view of a center driven water clarifier.

A typical center driven water clarifier 10 is shown in FIG. 1. Wastewater enters clarifier 12, generally a circular basin, through influent pipe 14, center pier 16, and influent ports 18. Sludge is removed from clarifier floor 26 through sludge return pipe 24. Squeegees 20, coupled to rotating flight arms 22, aid the sludge removal by substantially sweeping clarifier floor 26. Center pier 16 supports the mechanisms which support and rotate flight arms 22, including motor 28, drive cage support 30 coupled to motor 28, and drive cage 32. Drive cage 32 is generally coupled to drive cage support 30 near the upper portion of center pier 16 (see FIG. 3). Platform 36 and connected bridge 25 may also be supported by center pier 16. This invention may also be used in other types of clarifier configurations.

Figure 2:
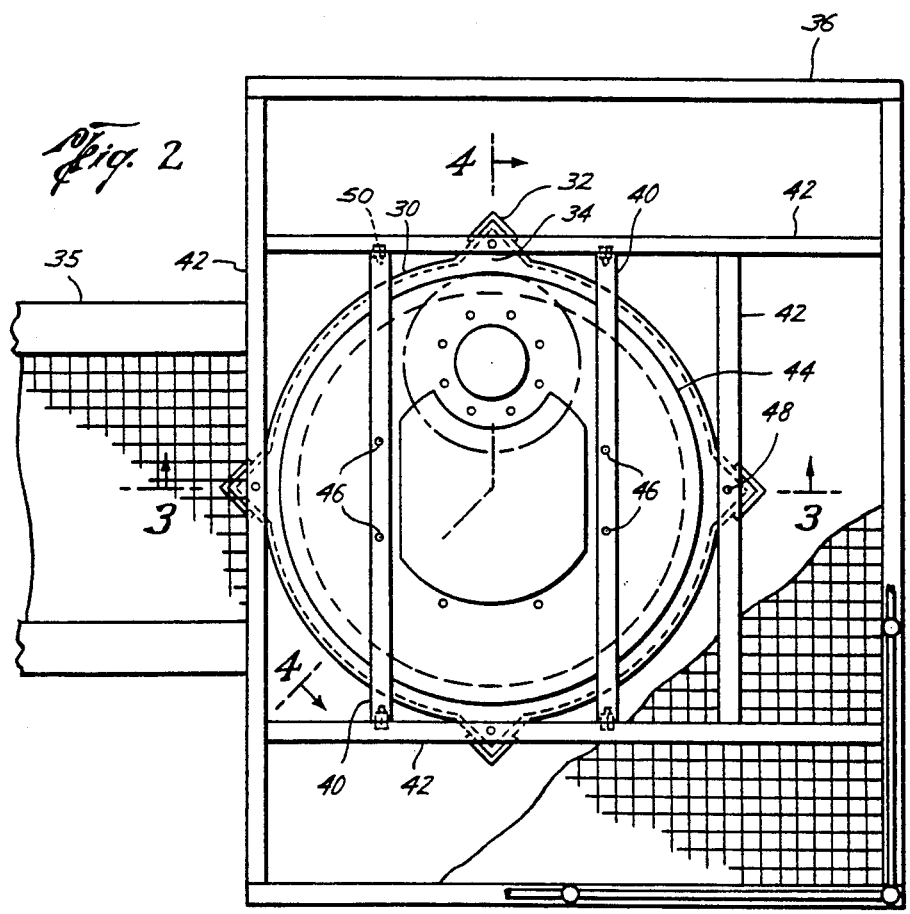
FIG. 2 is a plan view of a water clarifier platform according to this invention.

A top view above center pier 16 of a water clarifier using an embodiment of the present invention is shown in FIG. 2. Platform 36 consists of platform support channels 40 and disassembly support channels 42. During normal operation of the clarifier, platform support channels 40, supported by cover plate 44, are secured to cover plate 44 by platform support fasteners 46. Cover plate 44, supported by center pier 16, is a nonrotating plate covering a portion of the drive mechanism. As will be more fully described below, in a preferred embodiment the drive mechanism comprises a drive housing, gears, a torque transfer ring, and bearings that transfer power from motor 28 to drive cage 32.

FIG. 2 also shows the top of drive cage 32 and rotating drive cage support 30. In the illustrated embodiment, drive cage support 30 has four drive cage support extensions 34 spaced 90 degrees apart around the periphery of the drive cage support. In order to maintain, replace or disassemble the drive mechanism, drive cage support 30 is rotated such that extensions 34 are positioned under disassembly support channels 42 as shown in FIG. 2. Jackbolts 48 are then used to support disassembly support channels 42 on drive cage support 30. With the support of the platform and bridge transferred to drive cage support 30, platform support channels 40 may be removed after fasteners 46 and fasteners 50 are unfastened. Removal of platform support channels 40 provides clearance to permit a workman to lift and remove cover plate 44 and to then maintain, replace or disassemble the mechanisms located under cover plate 44. Equally effective embodiments of the present invention may be constructed which use substantially different platform or bridge arrangements. Also, alternative means may be provided for gaining access to the internal mechanisms below plate 44.

Figure 3:
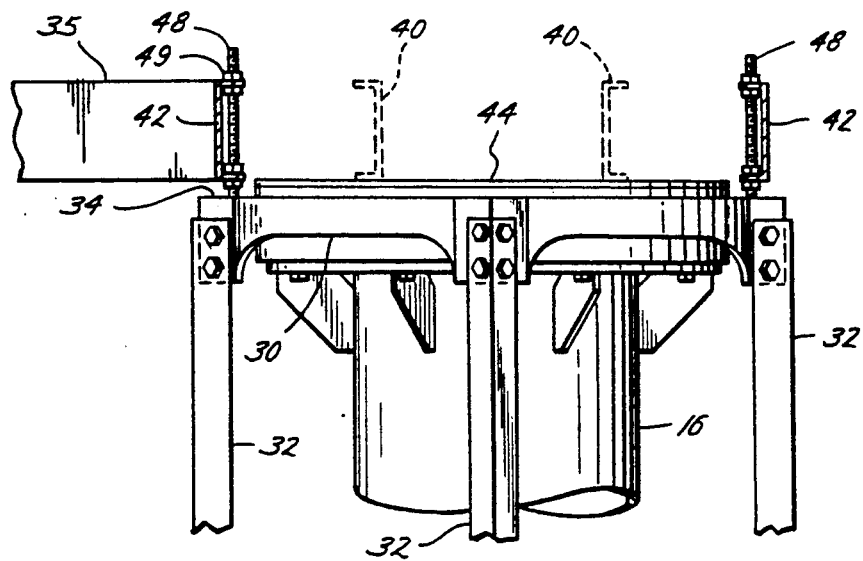
FIG. 3 is a side elevation view of the platform of FIG. 2 illustrating the removable platform support channels.

A side view of a preferred embodiment showing the accessibility of cover plate 44 is provided in FIG. 3. Platform support channels 40 that have been unfastened and removed are shown by dashed lines. Disassembly support channels 42 are now supported, through jackbolts 48 and jackbolt nuts 49, by drive cage support extensions 34. FIG. 3 also displays a connection between drive cage 32 and drive cage support 30 at drive cage support extensions 34. It would be recognized by those skilled in the art that other suitable means for connecting drive cage 32 and drive cage support 30 may exists. Drive cage 32 and drive cage support 30 may even be formed in one piece. Further, means other than the drive cage support extensions 34 as illustrated may be used to place the drive cage support under the disassembly support channels. For example, the entire drive cage support may extend far enough radially to extend under the disassembly support channels.

Figure 4:
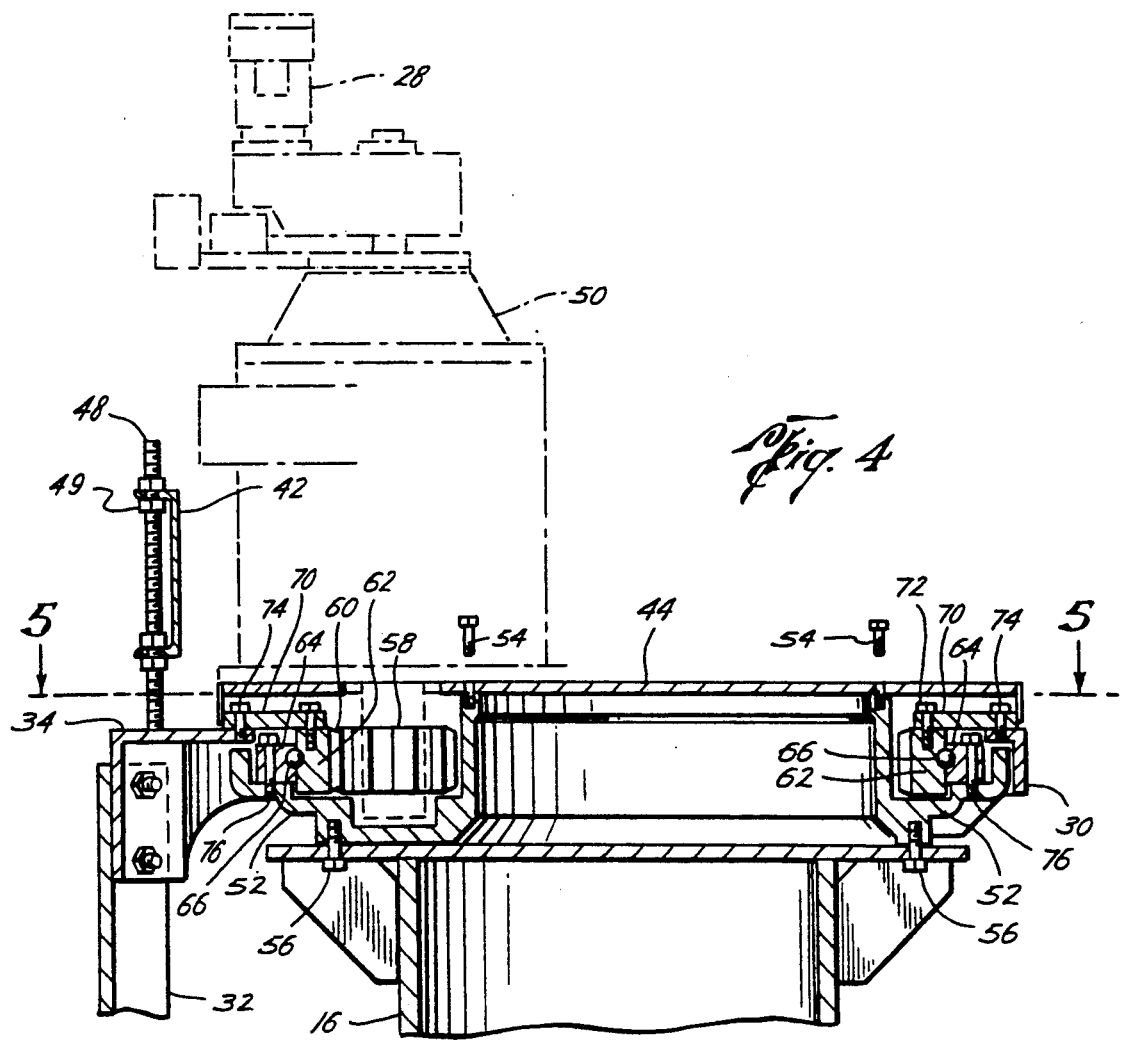
FIG. 4 is cross-sectional view, along section line 4 of FIG. 2, of the clarifier drive mechanism according to this invention.

The details of the gear mechanisms of a preferred embodiment of the invention are shown in more detail in FIGS. 4-6. FIG. 4 shows a cross section of the invention with cover plate 44 in place, but with platform support members 40 removed. Motor 28 and reducer assembly 50, shown as dashed lines, are understood to be removed prior to gear disassembly and both are standard mechanisms well known in the art. Reducer assembly 50 typically comprises both primary and intermediate reducers. Drive pinion 58 is coupled to reducer assembly 50 in order to provide torque to the gears.

In a preferred embodiment, cover plate 44 is connected to drive housing 52 with bolts 54 bolts or other suitable fastening means. Drive housing 52 is made of a rigid material, such as steel or cast iron. Drive housing 52 is in turn connected to center pier 16 with bolts 56 or other suitable means. Under cover plate 44, drive pinion 58 operatively engages hoop gear 62. Hoop gear assembly 60 comprises (a) hoop gear 62 which has an integral inner bearing race, (b) an outer stationary bearing race 64 and (c) bearings 66. Outer stationary bearing race 64 is secured to drive housing 52 by bolts 76 or other fastening means.

A suitable hoop gear assembly, which includes the inner race, the outer race, and the ball bearings is available as a unit from, for example, Avon Bearings Corporation, Avon Ohio, as a Series T-bearing/internal gear. In the currently preferred embodiment, a spur gear is used. However, those with skill in the art will realize that a helical, herring bone, or other type of gear may also be suitable for use in this invention. Furthermore, cast iron bearing races with strip liners may be utilized with the present invention as well as the preferred steel bearing assemblies.

Torque transfer ring 70 is connected to hoop gear 62 of hoop gear assembly 60 by torque transfer ring inner bolts 72, such as ⅜" hex-head machine bolts or other suitable fastening means. During normal operations, torque transfer ring 70 transfers torque from hoop gear 62 to drive cage support 30 by connecting torque transfer ring 70 to drive cage support 30 using torque transfer ring outer bolts 74, such as ⅜" hex-head machine bolts or other suitable fastening means. When operatively assembled, drive cage support 30 is supported by torque transfer ring outer bolts 74 such that drive cage support 30 does not touch drive housing 52, as illustrated by the small gap under bolts 74 in FIG. 4.

A top view of a preferred embodiment of the invention is displayed in FIG. 5 with motor 28, reducer 50 and cover plate 44 removed. As can be more clearly seen in FIG. 5, drive pinion 58 operatively engages hoop gear 62. Also, torque transfer ring 70 has a ring of torque transfer ring outer bolts 74 and a ring of torque transfer ring inner bolts 72.

After cover plate 44 is removed during disassembly to repair or replace gear assembly 60, the torque transfer ring must be disengaged from hoop gear 62 of hoop gear assembly 60 and from drive cage support 30. Thus, torque transfer ring outer bolts 74 and inner bolts 72 must be removed. However, since torque transfer ring outer bolts 74 support drive cage support 30, which in turn supports drive cage 32 and flight arms 22, alternative means is needed to support drive cage support 30.

As seen in FIG. 5A, such supporting means may be provided by inserting a shoulderless socket support screw 80 or other suitable screw into the vacated bolt hole created by removing torque transfer ring outer bolt 74. Since support screw 80 is shoulderless, it may be screwed below torque transfer ring 70 through threads in drive cage support 30 and into supporting contact with drive housing 52. With support screw 80 installed, drive cage support 30 is supported by drive housing 52 through screw 80. Preferably, at least eight support screws 80 should be placed in the series of vacated torque transfer ring outer bolt holes. The preferred steps for disassembly of the drive mechanism will be described in more detail below.

With several support screws 80 in place, torque transfer ring 70 may be lifted out of drive housing 52 and bolts 76 which secure outer stationary bearing race 64 of hoop gear assembly 60 to drive housing 52 may be removed. Hoop gear assembly 60 may then be removed from drive housing 52 for maintenance or replacement. FIG. 6 shows torque transfer ring 70 and hoop gear assembly 60 lifted out of drive housing 52. As can be seen, removal of hoop gear assembly 60 is possible while drive cage support 30 and drive cage 32 are supported by center pier 16 through drive housing 52 and support screws 80. Therefore, clarifier 12 does not have to be drained and support does not have to be provided for the flight arms 22 and the drive cage 32 while hoop gear assembly 60 is serviced. Torque transfer ring 70 may be formed as a single unitary piece, or it may comprise a plurality of ring segments which connect hoop gear 62 to drive cage support 30.

In order to more fully describe an embodiment of the present invention, preferred steps comprising the method of disassembling the clarifier gears will be presented. First, drive cage support 30 is rotated such that drive cage support extensions 34 are positioned under disassembly support channels 42. Platform support fasteners 46 that secure platform 36 and bridge 35 to cover plate 44 are then removed. Next, jackbolts 48 are inserted through disassembly support channels 42 and jackbolt nuts 49 are positioned so that platform 36 and bridge 35 are supported by jackbolts 48 which preferably engaged all four drive cage support extensions 34. Fasteners 50 are then unfastened, allowing platform support channels 40 to be removed. Motor 28 and reducer assembly 50 are hoisted and detached from the clarifier. It would be apparent to one of skill in the art that the sequence of these steps could be altered.

Next, bolts 54 are removed and cover plate 44 is lifted. With the torque transfer ring now exposed, four torque transfer ring outer bolts 74 may be removed. Preferably, the bolts removed are evenly spaced around the outer bolt circle. It is understood that the number of bolts in the bolt circle, and the number of bolts removed, may be varied depending on the specific application of the invention. In each vacated bolt hole created by removing bolts 74, a shoulderless socket support screw 80 is inserted and screwed through threads in the bolt hole of drive cage support 30 until firm contact with drive housing 52 is made. Then, more torque transfer ring outer bolts 74 are removed, and some or all of them may similarly be replaced with shoulderless socket support screws 80. For example, four additional support screws 80 may be inserted, such that the drive cage support 30 is supported by eight support screws 80. Finally, any remaining torque transfer ring outer bolts 74 are removed.

At this point in the described embodiment, drive cage support 30 is supported directly on drive housing 52 by virtue of at least four shoulderless socket support screws 80. The remaining torque transfer ring outer bolts 74 and all of the torque transfer ring inner bolts 72 may then be removed. Torque transfer ring 70 may then be removed from drive housing 52, exposing gear assembly 60 to permit its removal or maintenance.

With torque transfer ring 70 removed, bolts 76 which secure hoop gear assembly 60 may be removed. Hoop gear assembly 60 may then be hoisted out of the clarifier so that the components of hoop gear assembly 60 may be serviced, repaired or replaced. Reassembly of the clarifier drive mechanism is performed by reversing the disassembly steps described above.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. An improvement in a clarifier for use in water clarification by solids separation, the clarifier comprising
   a central vertical pier that supports a driven assembly that includes (a) flight arms for rotation around the pier, (b) a drive cage connected to the flight arms and (c) a rotating drive cage support connected to the drive cage;
   a drive mechanism coupled to the driven assembly, the drive mechanism including (a) a drive housing supported by the pier and (b) an internally cut hoop gear supported by a bearing assembly connected to the drive housing; and
   a bridge disposed between a peripheral edge of the clarifier and the pier to provide access to the drive mechanism;
   the improvement comprising:
   a torque transfer ring which removably connected between the hoop gear and the drive cage support;
   means for resting the driven assembly on the drive housing such that the driven assembly may be disconnected from the torque transfer ring;
   whereby the torque transfer ring, hoop gear, and bearing assembly may be replaced or repaired without disconnecting the driven assembly from the pier.

2. The improvement of claim 1, wherein the torque transfer ring has a plurality of outer bolt holes to correspond with threaded bolt holes in the rotating drive cage support, and also having a plurality of inner bolt holes to correspond with bolt holes in the hoop gear.

3. The improvement of claim 2, wherein the driven assembly supporting means comprises a plurality of support screws which pass through the outer bolt holes in the torque transfer ring, threadibly engage threaded bolt holes in the drive cage support and protrude beneath the drive cage support to contact the drive housing, and to thereby rest the driven assembly on the drive housing.

4. The improvement of claim 1, wherein the torque transfer ring is of unitary construction.

5. The improvement of claim 1, further comprising means for supporting the bridge above the pier on said drive cage and means to provide a clearance to permit removal of the torque transfer ring, hoop gear and bearing assembly without removal of the bridge from the clarifier.

6. The improvement of claim 5, wherein the bridge supporting means comprises a plurality of jackbolts engaging the drive cage support, and wherein the jackbolts further engage and support the bridge.

7. The improvement of claim 6, wherein the bridge comprises removable platform support channels removeably secured to a cover plate of the drive mechanism, which platform support channels may be removed when the bridge is supported by the jackbolts and the drive cage support, and wherein removal of the platform support channels provides said clearance for access to the torque transfer ring, hoop gear, bearing assembly and other components of the drive mechanism.

8. A clarifier for use in water clarification by solids separation, comprising:
   a central stationary drive housing;
   a driven assembly for rotation around the drive housing including flight arms within the clarifier;
   an internally cut hoop gear disposed in the drive housing and connected to the driven assembly;
   a torque transfer ring removeably connecting the gear and the driven assembly; and
   means for temporarily supporting the driven assembly from drive housing such that the driven assembly may be disconnected from the torque transfer ring without requiring external support for the driven assembly;
   such that the torque transfer ring and gear may be replaced or repaired without draining the clarifier and without disconnecting or disassembling the driven assembly and without requiring lifting of the driven assembly.

9. The clarifier of claim 8, wherein the driven assembly comprises a rotating drive cage support having a plurality of threaded bolt holes, and wherein the torque transfer ring has a plurality of outer bolt holes to correspond with threaded bolt holes in the rotating drive cage support and a plurality of inner bolt holes to correspond with bolt holes in the gear.

10. The clarifier of claim 9, wherein the driven assembly supporting means comprises a plurality of support screws which pass through the outer bolt holes in the torque transfer ring, threadibly engage the threaded bolt holes in the drive cage support and protrude beneath the drive cage support to contact the drive housing, and to thereby support the drive cage support upon the drive housing.

11. A clarifier drive assembly comprising:

a hoop gear assembly having an inner cut rotating portion and an outer stationary portion coupled by bearing means, the stationary portion coupled to a stationary drive housing;

a drive cage support for rotation around the housing, having means for connection to a drive cage for rotating a set of flight arms;

a torque transfer ring removably fastened to the rotating portion of the hoop gear, and removably fastened to the drive cage support; and means for supporting the drive cage support upon the drive housing comprising plurality of support screws such that the torque transfer ring, gear, and bearing assembly may be removed without disassembly or removal of the drive cage support.

* * * * *

UNITED STATES PATENT AND TRADEMARK OFFICE
CERTIFICATE OF CORRECTION

PATENT NO. : 5,264,126

DATED : November 23, 1993

INVENTOR(S) : Robert H. Shurtleff

It is certified that error appears in the above-identified patent and that said Letters Patent is hereby corrected as shown below:

In claim 1 at column 7, line 61, replace "connected" with --connects--.

In claim 2 at column 8, line 2, insert --first-- before "plurality."

In claim 2 at column 8, line 2, before "bolt" delete "outer."

In claim 2 at column 8, line 4, insert --second-- before "plurality."

In claim 2 at column 8, line 4, before "bolt" delete the word "inner."

In claim 3 at column 8, line 12, delete the word "to."

In claim 3 at column 8, line 6, change "claim 2" to --claim 12--.

In claim 5 at column 8, line 18, insert --support-- between "cage" and "drive."

In claim 8 at column 8, line 43, insert --the-- between "from" and "drive."

In claim 9 at column 8, line 59, insert --first-- before "plurality."

In claim 9 at column 8, line 59, betweeen "of" and "bolt" delete "outer."

UNITED STATES PATENT AND TRADEMARK OFFICE
CERTIFICATE OF CORRECTION

PATENT NO.   :   5,264,126
DATED        :   November 23, 1993
INVENTOR(S)  :   Shurtleff It is certified that error appears in the above-identified patent and that said Letters Patent is hereby corrected as shown below:

In claim 9 at column 8, line 61, insert --second-- "between "a" and "plurality."

In claim 9 at column 8, line 61, between "of" and "bolt" delete "inner."

In claim 10 at column 8, line 63, change "claim 9" to --claim 13--.

In claim 10 at column 8, line 65, change several lines starting with "which pass..." until the end of claim "...the drive housing."

In claim 11 at column 9, line 7, replace "a hoop gear" with --an inner cut hoop gear--.

In claim 11 at column 9, line 7, replace "an inner cut rotating portion" with --a rotating portion--.

In claim 11 at column 10, line 2, replace "having means for connection" with --connectable--.

In claim 11 at column 10, line 7, replace "means for supporting the drive cage upon the drive housing comprising" with --a--.

In claim 11 at column 10, line 9, insert --for supporting the drive cage upon the drive housing-- between "screws" and "such."

UNITED STATES PATENT AND TRADEMARK OFFICE
CERTIFICATE OF CORRECTION

PATENT NO. : 5,264,126

DATED : November 23, 1993

INVENTOR(S) : Shurtleff

It is certified that error appears in the above-identified patent and that said Letters Patent is hereby corrected as shown below:

COLUMN 10:

Insert as claim 12: --The improvement of claim 2 wherein the first plurality of bolt holes comprises a plurality of outer bolt holes and the second plurality of bolt holes comprises a plurality of inner bolt holes--.

Insert as claim 13: --The improvement of claim 9 wherein the first plurality of bolt holes comprises a plurality of outer bolt holes and the second plurality of bolt holes comprises a plurality of inner bolt holes--.

Insert as claim 14: --The clarifier of claim 10 wherein the plurality of support screws pass through the outer bolt holes in the torque transfer ring, threadibly engage the threaded bolt holes in the drive cage support, and protrude beneath the drive cage support to contact the drive housing, and thereby support the drive cage support upon the drive housing--.

Signed and Sealed this

Twenty-eighth Day of June, 1994

Attest:

BRUCE LEHMAN

Attesting Officer

Commissioner of Patents and Trademarks